United States Patent [19]

Lehmacher et al.

[11] Patent Number: 6,028,918
[45] Date of Patent: Feb. 22, 2000

[54] TELECOMMUNICATION SYSTEM, AND SWITCHING MEANS, AND MEMORY MEANS, AND METHOD

[75] Inventors: Markus Lehmacher, Stuttgart; Stephan Rupp, Besigheim, both of Germany

[73] Assignee: Alcatel, Paris, France

[21] Appl. No.: 09/092,361

[22] Filed: Jun. 5, 1998

[30] Foreign Application Priority Data

Jun. 18, 1997 [EP] European Pat. Off. ............. 97440052

[51] Int. Cl.⁷ .................................................. H04M 15/00
[52] U.S. Cl. .......................... 379/114; 379/202; 455/408
[58] Field of Search ................................. 379/112, 114, 379/115, 121, 127, 202, 203, 204; 455/406, 408

[56] References Cited

U.S. PATENT DOCUMENTS

| 5,381,467 | 1/1995 | Rosinski et al. |  |
|---|---|---|---|
| 5,568,541 | 10/1996 | Greene | 379/114 |
| 5,579,379 | 11/1996 | D'Amico et al. |  |
| 5,631,904 | 5/1997 | Fitser et al. | 379/127 |
| 5,796,790 | 8/1998 | Brunner | 455/406 |
| 5,815,560 | 9/1998 | Kasai et al. | 379/114 |
| 5,909,485 | 6/1999 | Martin et al. | 455/406 |
| 5,937,044 | 8/1999 | Kim | 379/121 |

FOREIGN PATENT DOCUMENTS

| 19515418 | 10/1996 | Germany. |
| 9405126 | 3/1994 | WIPO. |
| 9506381 | 3/1995 | WIPO. |
| 9631072 | 10/1996 | WIPO. |
| 9636192 | 11/1996 | WIPO. |

*Primary Examiner*—Paul Loomis
*Attorney, Agent, or Firm*—Ware, Fressola, Van Der Sluys & Adolphson LLP

[57] ABSTRACT

Known telecommunication systems according to which a calling subscriber can reach a user, whereby a part of the costs have to be paid by said calling subscriber and another part of the costs have to be paid by said called user, are unsufficiently suitable for business purposes. By making said user reachable via at least two different ways, or in other words, via at least two different numbers, with each way and number having its own billing method, said telecommunication system becomes sufficiently suitable for business purposes.

14 Claims, 2 Drawing Sheets

TELECOMMUNICATION SYSTEM, AND SWITCHING MEANS, AND MEMORY MEANS, AND METHOD

BACKGROUND OF THE INVENTION

1. Technical Field

The invention relates to a telecommunication system comprising switching means for, in response to a call set up signal originating from a subscriber, making a coupling between said subscriber and a terminal user, generating means for, in response to a starting part of said coupling, generating a first billing signal, and for, in response to a finishing part of said coupling, generating a second billing signal, and memory means for storing first billing information corresponding with said first billing signal at a first location corresponding to said subscriber and for storing second billing information corresponding with said second billing signal at a second location corresponding to said terminal user.

2. Discussion of Related

Such a telecommunication system is known from WO 96/31072, which discloses switching means (see MSC A 14 and MSC B 20 in FIGS. 1 and 2 of WO 96/31072) for making a coupling from a subscriber (see PSTN 10 or MS 12 in FIGS. 1 and 2 of WO 96/30172) to a terminal user (see MS-B 16 in FIGS. 1 and 2 of WO 96/30172), and discloses generating means for generating a first billing signal (see claim 1 of WO 96/30172: G-MSC generating first billing identification data) and for generating a second billing signal (see claim 1 of WO 96/30172: means within V-MSC allocating second billing identification data), and discloses memory means (see claim 8 of WO 96/30172: HLR and VLR).

In case of said telecommunication system having a mobile telecommunication function, said call set up signal is generated by said fixed or mobile subscriber, for example by dialing a first number defining said mobile terminal user, in response to which said switching means consult said memory means for receiving location information with respect to said mobile terminal user for making said coupling, independently of said user being in the same network or being in a different network (abroad). However, in case of said user being in said different network (abroad), in general the costs of a starting part (situated in the same network) of said coupling will have to be paid by said subscriber, while the costs of a finishing part (situated in the different network) will have to be paid by said mobile terminal user. Thereto, said generating means generate, in response to said starting part of said coupling, a first billing signal, and generate, in response to said finishing part of said coupling, a second billing signal. Said memory means store first billing information corresponding with said first billing signal at a first location corresponding to said subscriber and store second billing information corresponding with said second billing signal at a second location corresponding to said mobile terminal user, for separating the costs of said one coupling.

In case of said telecommunication system having a fixed telecommunication function with a so-called follow-me function and/or having a so-called universal personal telecommunication function, said call set up signal is generated by said fixed or mobile subscriber, for example by dialing a first number defining said fixed terminal user, in response to which said switching means consult said memory means for receiving position information with respect to said fixed terminal user for making said coupling, independently of the position of said user. However, in case of said user not being at his home position, in general the costs of a starting part (from said subscriber until said home position) of said coupling will have to be paid by said subscriber, while the costs of a finishing part (from said home position until a factual position of said user) will have to be paid by said fixed terminal user. Thereto, said generating means generate, in response to said starting part of said coupling, a first billing signal, and generate, in response to said finishing part of said coupling, a second billing signal. Said memory means store first billing information corresponding with said first billing signal at a first location corresponding to said subscriber and store second billing information corresponding with said second billing signal at a second location corresponding to said mobile terminal user, for separating the costs of said one coupling.

Such a known telecommunication system is disadvantageous, inter alia, because of being insufficiently suitable for business purposes.

SUMMARY OF THE INVENTION

It is an object of the invention, inter alia, to provide a telecommunication system as described in the which is sufficiently suitable for business purposes.

Thereto, the telecommunication system according to the invention is characterized in that said switching means are adapted for, in response to a further call set up signal originating from a further subscriber, making a further coupling between said further subscriber and said terminal user, said further call set up signal being different from said call set up signal, said generating means are adapted for, in response to at least a finishing part of said further coupling, generating a third billing signal, and said memory means are adapted for storing third billing information corresponding with said third billing signal at a third location corresponding to a third party, said third party being different from said terminal user.

By making said further coupling between said further subscriber and said terminal user, in response to said further call set up signal which is generated by said further subscriber, for example by dialing a second number also defining (like said first number) said mobile terminal user, with said further call set up signal (said second number) being different from said call set up signal (said first number), and with said further subscriber corresponding with or differing from said subscriber, by generating said third billing signal, in response to at least a finishing part of said further coupling, and by storing third billing information corresponding with said third billing signal at a third location corresponding to a third party, with said third party being different from said terminal user, the telecommunication system according to the invention is sufficiently suitable for business purposes due to the fact that said user can be reached either according to a first, conventional way (including a separation of costs for the calling subscriber and the called user) or according to a second, new way (whereby at least a part of the costs are paid by a third party).

The problem of known telecommunication systems being insufficiently suitable for business purposes is thus solved by allowing the user to be reached in at least two different ways, each way having its own billing method.

The invention is based on the insight that different ways, each way having its own billing method, can be used to reach the same user.

A first embodiment of the telecommunication system according to the invention is characterized in that said switching means comprise at least a first switch and a second switch, said starting part of said coupling comprising at least a connection between said subscriber and said first switch, said finishing part of said coupling and said finishing part of said further coupling each comprising at least a connection between said second switch and said terminal user.

Said switches can be switches for mobile communication (for example mobile switching centers or MSCs) and/or switches for fixed communication (for example service control points or SCPs and/or service switching points or SSPs).

A second embodiment of the telecommunication system according to the invention is characterized in that said terminal comprises a mobile station and that said coupling and said further coupling each comprise at least one base station, at least one of said call set up signals defining said user of said mobile station.

According to this mobile embodiment, with at least one of said call set up signals defining said user of said mobile station, the other call set up signal will either also define said user of said mobile station or define a different destination, however also resulting in reaching said user of said mobile station.

A third embodiment of the telecommunication system according to the invention is characterized in that said switching means comprise converting means for converting said further call set up signal into said call set up signal defining said terminal.

Said converting means, in case of being a solitary unit, can be located in any one part of said switching means (like in any one of said switches), and in case of being at least two units, can be located in any one part of said switching means or can be spread over parts of said switching means.

A fourth embodiment of the telecommunication system according to the invention is characterized in that said switching means comprise converting means for converting both said call set up signal and said further call set up signal into a yet further call set up signal defining said terminal.

Said converting means, in case of being a solitary unit, can be located in any one part of said switching means (like in any one of said switches), and in case of being at least two units, can be located in any one part of said switching means or can be spread over parts of said switching means.

The invention further relates to switching means comprising generating means both as defined in a telecommunication system according to the invention, and to memory means as defined in a telecommunication system according to the invention.

The invention yet further relates to a method comprising the steps of in response to a call set up signal originating from a subscriber, making a coupling between said subscriber and a terminal user via switching means, in response to a starting part of said coupling, generating a first billing signal, in response to a finishing part of said coupling, generating a second billing signal, storing first billing information corresponding with said first billing signal at a first location corresponding to said subscriber, and storing second billing information corresponding with said second billing signal at a second location corresponding to said terminal user.

Said method according to the invention is characterized in that said method comprises the steps of in response to a further call set up signal originating from a further subscriber, making a further coupling between said further subscriber and said terminal user, said further call set up signal being different from said call set up signal, in response to at least a finishing part of said further coupling, generating a third billing signal, and storing third billing information corresponding with said third billing signal at a third location corresponding to a third party, said third party being different from said terminal user.

A first embodiment of the method according to the invention is characterized in that said switching means comprise at least a first switch and a second switch, said starting part of said coupling comprising at least a connection between said subscriber and said first switch, said finishing part of said coupling and said finishing part of said further coupling each comprising at least a connection between said second switch and said terminal user.

A second embodiment of the method according to the invention is characterized in that said terminal comprises a mobile station and that said coupling and said further coupling each comprise at least one base station, at least one of said call set up signals defining said user of said mobile station.

From WO 96/36192 a mobile telecommunication subscriber system in a multi-operator environment is known. Neither from WO 96/30172 nor from WO 96/36192 it is known to be able to reach a terminal user via two different ways (two different numbers), each way having its own billing method. All references including further references cited with respect to and/or inside said references are considered to be by reference in this patent application for background.

BRIEF DESCRIPTION OF THE DRAWING

The invention will be explained in greater detail by way of embodiments disclosed in the drawings, whereby FIG. 1 discloses a telecommunication system according to the invention comprising switching means according to the invention and memory means according to the invention, and FIG. 2 discloses a flow chart of a method according to the invention for use in a telecommunication system according to the invention.

DETAILED DETAILED DESCRIPTION OF THE PREFERRED EMBODIMENT

Figure 1:
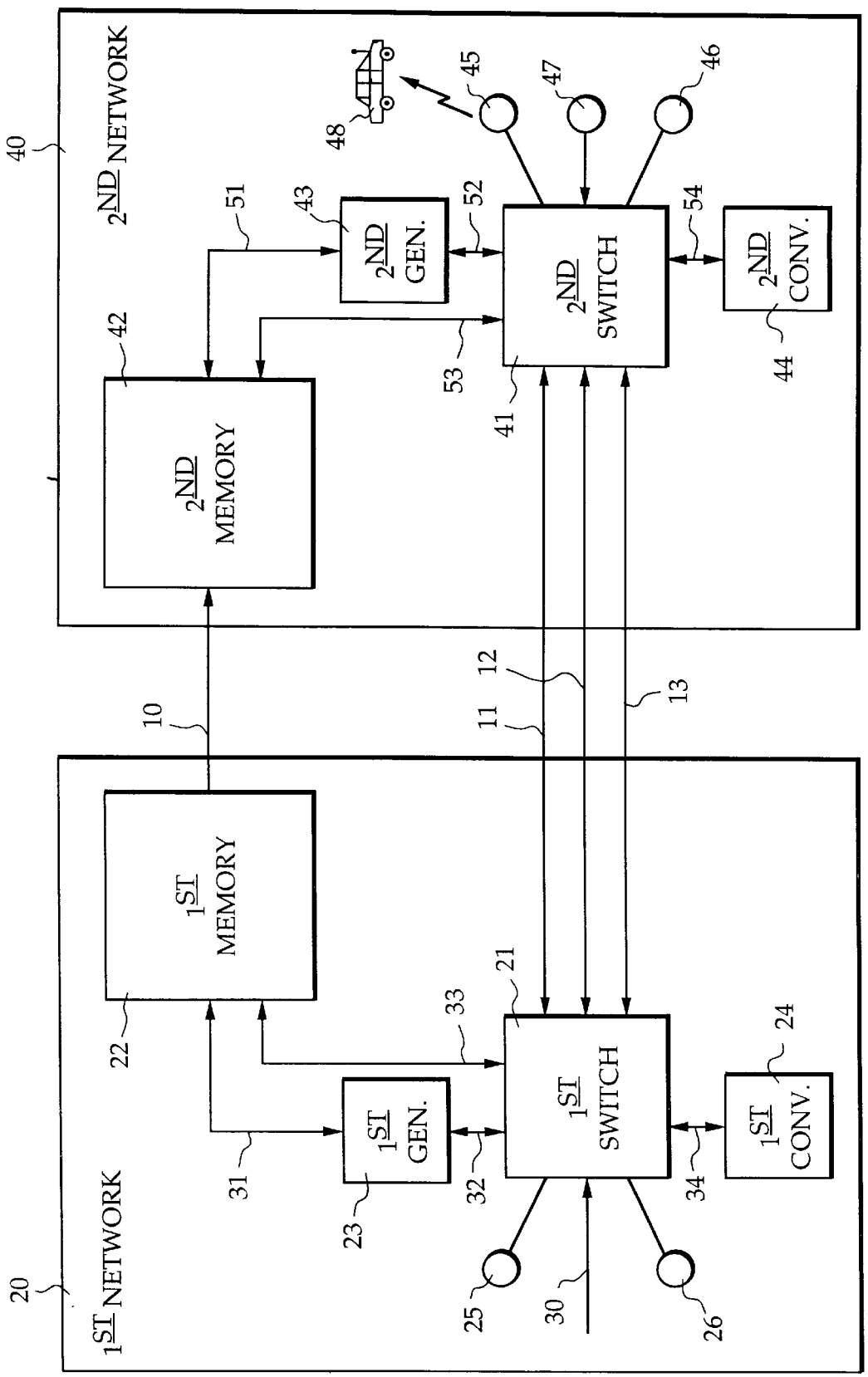

The telecommunication system disclosed in FIG. 1 comprises a first network 20 and a second network 40. First network 20 comprises a first switch 21, a first memory 22, a first generator 23 and a first converter 24. First switch 21 is coupled to two base stations 25 and 26 and to a PSTN (Public Switched Telephone Network) not shown in the figures via a connection 30 and to first memory 22 via a connection 33 and to first generator 23 via a connection 32 and to first converter 24 via a connection 34 and to second network 40 via connections 11, 12 and 13. First memory 22 is coupled to second network 40 via a connection 10 and to first generator 23 via a connection 31. Second network 40 comprises a second switch 41, a second memory 42, a second generator 43 and a second converter 44. Second switch 41 is coupled to three base stations 45, 46 and 47 and to second memory 42 via a connection 53 and to second generator 43 via a connection 52 and to second converter 44 via a connection 54 and to first network 20 via connections 11, 12 and 13. Second memory 42 is coupled to first network 20 via a connection 10 and to second generator 43 via a connection 51.

First switch 21 and second switch 41 together for example form switching means. First memory 22 and second memory 42 together for example form memory means. First generator 23 and second generator 43 together for example form generating means. First converter 24 and second converter 44 together for example form converting means.

The telecommunication system functions as follows. A subscriber in network 20 trying to contact a mobile terminal user 48, who is usually located in network 20 and who therefore has memory 22 as so-called Home Location Register or HLR, dials a first number defining said mobile terminal user 48, in response to which a first call set up signal enters switch 21 via connection 30 in case of said subscriber being a fixed one or for example via base station 25 in case of said subscriber being a mobile one. Switch 21 supplies said first number to memory 22 via connection 33, to get information with respect to the location of mobile terminal user 48. Memory 22 informs switch 21 via connection 33 that mobile terminal user is located in network 40 near switch 41, in response to which switch 21 sends the first call set up signal to switch 41, for example via connection 11. Switch 21 further orders generator 23 via connection 32 to generate a first billing signal defining the costs of this call respecting a starting part of the coupling between said subscriber and said mobile terminal user. This starting part for example comprises that part of said coupling which is located between said subscriber and switch 21. The first billing signal is supplied to memory 22 via connection 31, in which memory 22 it is stored at a first location defining said subscriber.

Switch 41 receives said first call set up signal and contacts mobile terminal user 48 via base station 45 in a way which is of common general knowledge to a person skilled in the art. Switch 41 further orders generator 43 via connection 52 to generate a second billing signal defining the costs of this call respecting a finishing part of the coupling between said subscriber and said mobile terminal user. This finishing part for example comprises that part of said coupling which is located between switch 21 and said mobile terminal user 48. The second billing signal is supplied to memory 42 via connection 51, in which memory 42 it is stored at a second location defining said mobile terminal user. After the call has been finished, memory 42 and memory 22 can exchange information via connection 10 to update the mobile terminal user's HLR (memory 22).

So, in case of said mobile terminal user 48 being in another network 40 (abroad) instead of his own network 20, in general the costs of a starting part (situated in the same network) of said coupling will have to be paid by said subscriber, while the costs of a finishing part (situated in the different network) will have to be paid by said mobile terminal user 48. Thereto, said generating means 23,43 generate said first billing signal and said second billing signal, and said memory means 22,42 store first billing information corresponding with said first billing signal at a first location corresponding to said subscriber and store second billing information corresponding with said second billing signal at a second location corresponding to said mobile terminal user 48, for separating the costs of said one coupling. Such a telecommunication system is disadvantageous, inter alia, because of being insufficiently suitable for business purposes.

The telecommunication system according to the invention is, however, sufficiently suitable for business purposes, due to it allowing the mobile terminal user to be reached in a extra, different way having its own, different billing method, which will be explained below.

The telecommunication system according to the invention functions as follows. A subscriber in network 20 trying to contact a mobile terminal user 48, who is usually located in network 20 and who therefore has memory 22 as so-called Home Location Register or HLR, dials a second number being different from said first number but also defining said mobile terminal user 48, in response to which a second call set up signal enters switch 21 via connection 30 in case of said subscriber being a fixed one or for example via base station 25 in case of said subscriber being a mobile one. Switch 21 supplies said second number to converter 24 via connection 34, which converts it into said first number and supplies said first number via connection 34 to switch 21, which supplies said first number to memory 22 via connection 33, to get information with respect to the location of mobile terminal user 48. Memory 22 informs switch 21 via connection 33 that mobile terminal user is located in network 40 near switch 41, in response to which switch 21 either, according to a first possibility, sends said second call set up signal but now comprising said first number to switch 41, for example again via connection 11, or, according to a second possibility, sends, as a result of the conversion, the first call set up signal to switch 41, but via an other connection 12 or 13. Switch 21 further orders generator 23 via connection 32 to generate a first billing signal defining the costs of this call respecting a starting part of the coupling between said subscriber and said mobile terminal user. This starting part for example comprises that part of said coupling which is located between said subscriber and switch 21. The first billing signal is supplied to memory 22 via connection 31, in which memory 22 it is stored at a first location defining said subscriber.

Switch 41 receives either, according to said first possibility, said second call set up signal comprising said first number via connection 11 or, according to said second possibility, said first call set up signal via connection 12 or 13, and contacts mobile terminal user 48 via base station 45 in a way which is of common general knowledge to a person skilled in the art. Switch 41 further orders generator 43 via connection 52 to generate a third billing signal defining the costs of this call respecting a finishing part of the coupling between said subscriber and said mobile terminal user. Said third billing signal is generated instead of said second billing signal due to switch 41 either detecting the second call set up signal comprising the first number but still being different from said first call set up signal or detecting the use of connection 12 or 13 instead of connection 11. This finishing part for example again comprises that part of said coupling which is located between switch 21 and said mobile terminal user 48. The third billing signal is supplied to memory 42 via connection 51, in which memory 42 it is stored at a third location defining a third party not being said mobile terminal user. After the call has been finished, memory 42 and memory 22 can exchange information via connection 10 to update the mobile terminal user's HLR (memory 22).

So, in case of said mobile terminal user 48 being in another network 40 (abroad) instead of his own network 20, this time the costs of a starting part (situated in the same network) of said coupling again will have to be paid by said subscriber, but the costs of a finishing part (situated in the different network) will have to be paid by said third party, for example the employer of said mobile terminal user 48, because of said mobile terminal user using his own mobile terminal abroad for business purposes. Thereto, said generating means 23,43 generate said first billing signal and said third billing signal, and said memory means 22,42 store first billing information corresponding with said first billing signal at a first location corresponding to said subscriber and store third billing information corresponding with said third billing signal at a third location corresponding to said third party. In general, said third billing signal could be generated either in said first network or in said second network.

Figure 2:
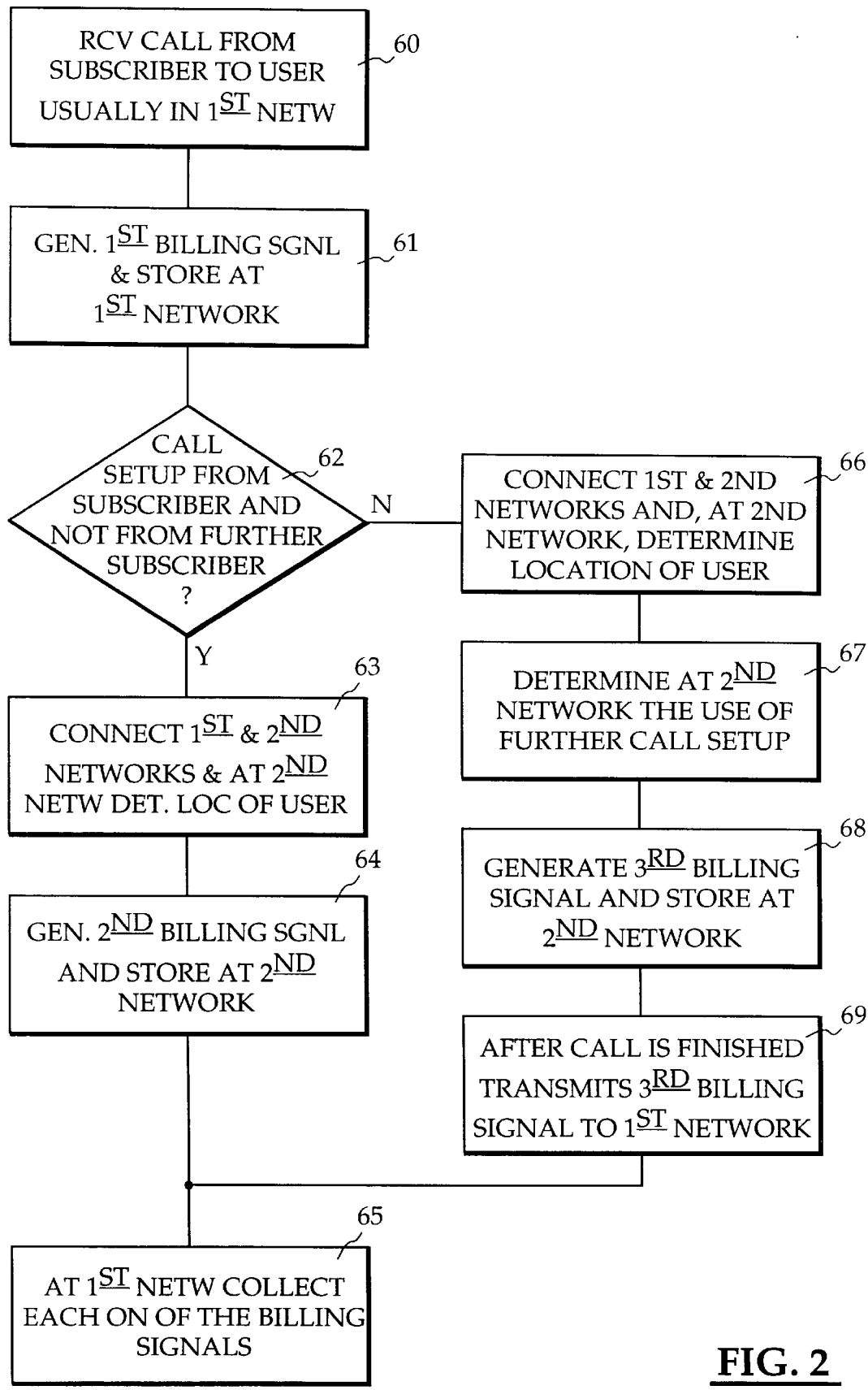

In the flow chart depicted in FIG. 2 the blocks have the following meaning:

block 60: at a first network, receival of a call set up signal originating from a subscriber; go to block 61;

block 61: at said first network, generation of first billing signal and storage of first billing information; go to block 62;

block 62: at said first network, determination of location of a user defined by said call set up signal and detection of said call set up signal being the call set up signal or another (further) call set up signal, if yes, go to block 63, if no, go to block 66;

block 63: at said first network, make connection with second network, and at said second network, determination of location of said user; go to block 64;

block 64: at said second network, generation of second billing signal and storage of second billing information; go to block 65;

block 66: at said first network, make connection with second network, and at said second network, determination of location of said user; go to block 67;

block 67: at said second network, determination of use of further call set up signal instead of call set up signal; go to block 68;

block 68: at said second network, generation of third billing signal and storage of third billing information; go to block 69;

block 69: at said second network, after finishment of call, transmission of third billing signal and/or third billing information to said first network; go to block 65; and block 65: at said first network, collection of each one of said billing signals and/or billing information.

The method according to the invention and operating in correspondence with said flow chart comprises the steps of in response to a call set up signal originating from a subscriber (block 60), making a coupling between said subscriber and a terminal user via switching means (blocks 62,63), in response to a starting part of said coupling, generating a first billing signal (block 61), in response to a finishing part of said coupling, generating a second billing signal (block 64), storing first billing information corresponding with said first billing signal at a first location corresponding to said subscriber (blocks 61,65), storing second billing information corresponding with said second billing signal at a second location corresponding to said terminal user (blocks 64,65), in response to a further call set up signal originating from a further subscriber, making a further coupling between said further subscriber and said terminal user (blocks 60,62,66), said further call set up signal being different from said call set up signal, in response to at least a finishing part of said further coupling, generating a third billing signal (blocks 67,68), and storing third billing information corresponding with said third billing signal at a third location corresponding to a third party (blocks 67,68,69,65), said third party being different from said terminal user.

Instead of using converter 24 for converting said second number into said first number, it is also possible to send said second number to network 40, in which it is converted by converter 44 into said first number for locating said user. In this case the fact that converter 44 is used could trigger generator 43 to generate said third billing signal instead of said second billing signal. Further, the possibility of converter 24 (or 44) (in)directly controlling generator 23 (or 43) should not be excluded.

Instead of generator 43 generating said third billing signal it is also possible that generator 43 generates the second billing signal, which is stored either at said third location in memory 42 (this third location indicating that this call corresponds with a different billing procedure) or at said second location in memory 42 but later transferred to for example a third location in memory 22 (due to for example switch 21 having informed memory 22 that a certain billing signal soon to come corresponds with a different billing procedure). Further, memory 22 and memory 42 could of course be two solitary units (in which case memory 22 corresponds with said HLR and/or a Visitor Location Memory or VLR and memory 42 corresponds with an other HLR and/or an other Visitor Location Memory or VLR) or being integrated into one unit. In general, each one of said memories 22 and 42 comprises for example a HLR and/or a VLR and/or a typical billing memory unit.

Instead of said possible so-called single conversion in converter 24 a so-called double conversion could also be possible. In that case for example said first number and said second number are each converted in a third number, which defines said mobile terminal user.

For both possible billing procedures, the spreading of the costs over the subscriber and the user or over the (further) subscriber and the third party is completely arbitrary, and other ways of spreading said costs should not be excluded (like for example said third party paying all costs, or the costs with respect to connections 11–13 being shifted towards said (further) subscriber, or in case of said third party being involved said subscriber only paying a fixed amount).

According to the above described embodiment, switch 21 for example is a so-called Gateway Mobile Switching Center or GMSC, and switch 41 is for example a further MSC. Between switches 21 and 41, there could be present a so-called Public Switched Telephone Network or PSTN, and further in case of both networks 20 and 40 being in different countries, there will be a so-called clearing house dealing with international money transfers.

Instead or in addition to using said converting means, inside said memory means there could also be a conversion, for avoiding said converting means, or for supporting said converting means, or just for some localization purposes. Said converting means could for example be realized by so-called table memories, each one having at least a left column comprising for example second numbers and a right column comprising for example first numbers, with two corresponding numbers being located on one row.

According to an other embodiment, where of said telecommunication system has a fixed telecommunication function with a so-called follow-me function and/or having a so-called universal personal telecommunication function, said call set up signal is generated by said fixed or mobile subscriber, for example by dialing a first number defining said fixed terminal user, in response to which said switching means consult said memory means for receiving position information with respect to said fixed terminal user for making said coupling, independently of the position of said user. However, in case of said user not being at his home position, in general the costs of a starting part (from said subscriber until said home position) of said coupling will have to be paid by said subscriber, while the costs of a finishing part (from said home position until a factual position of said user) will have to be paid by said fixed terminal user. Thereto, said generating means generate, in response to said starting part of said coupling, a first billing signal, and generate, in response to said finishing part of said coupling, a second billing signal. Said memory means store first billing information corresponding with said first billing signal at a first location corresponding to said subscriber and store second billing information corresponding with said second billing signal at a second location corresponding to said mobile terminal user, for separating the costs of said one coupling. In response to said further call set up signal generated by said further fixed or mobile subscriber, for example by dialing a second number defining said fixed terminal user, said switching means again consult said memory means for receiving position information with respect to said fixed terminal user for making said coupling, independently of the position of said user. Said generating means now generate, in response to said starting part of said coupling, a first billing signal, and generate, in response to said finishing part of said coupling, a third billing signal. Said memory means then store first billing information corresponding with said first billing signal at a first location corresponding to said subscriber and store third billing information corresponding with said third billing signal at a third location corresponding to said third party.

Connections 11–13 symbolize signalling connections and data and/or speech connections, and could be based on analog and/or digital technologies. Connection 10 could also be based on analog and/or digital technologies, and could use either a signalling connection or a data and/or speech connection, and could possibly be routed via connections 11–13. Although the invention has been shown and described with respect to a best mode embodiment thereof, it should be understood by those skilled in the art that the foregoing and various other changes, ommissions and additions in the form and detail thereof may be made therein without departing from the spirit and scope of the invention.

We claim:

1. Telecommunication system comprising
    switching means for, in response to a call set up signal originating from a subscriber, making a coupling between said subscriber and a terminal user,
    generating means for, in response to a starting part of said coupling, generating a first billing signal, and for, in response to a finishing part of said coupling, generating a second billing signal, and
    memory means for storing first billing information corresponding with said first billing signal at a first location corresponding to said subscriber and for storing second billing information corresponding with said second billing signal at a second location corresponding to said terminal user,
    characterized in that
        said switching means are adapted for, in response to a further call set up signal originating from a further subscriber, making a further coupling between said further subscriber and said terminal user, said further call set up signal being different from said call set up signal,
        said generating means are adapted for, in response to at least a finishing part of said further coupling, generating a third billing signal, and
        said memory means are adapted for storing third billing information corresponding with said third billing signal at a third location corresponding to a third party, said third party being different from said terminal user.

2. Telecommunication system according to claim 1, characterized in that said switching means comprise at least a first switch and a second switch, said starting part of said coupling comprising at least a connection between said subscriber and said first switch, said finishing part of said coupling and said finishing part of said further coupling each comprising at least a connection between said second switch and said terminal user.

3. Telecommunication system according to claim 1, characterized in that said terminal comprises a mobile station and that said coupling and said further coupling each comprise at least one base station, at least one of said call set up signals defining said user of said mobile station.

4. Telecommunication system according to claim 1, characterized in that said switching means comprise converting means for converting said further call set up signal into said call set up signal defining said terminal.

5. Telecommunication system according to claim 1, characterized in that said switching means comprise converting means for converting both said call set up signal and said further call set up signal into a yet further call set up signal defining said terminal.

6. Switching means for use in a telecommunication system comprising switching means for, in response to a call set up signal originating from a subscriber, making a coupling between said subscriber and a terminal user,
    generating means for, in response to a starting part of said coupling, generating a first billing signal, and for, in response to a finishing part of said coupling, generating a second billing signal, and
    memory means for storing first billing information corresponding with said first billing signal at a first location corresponding to said subscriber and for storing second billing information corresponding with said second billing signal at a second location corresponding to said terminal user,
    characterized in that
        said switching means are adapted for, in response to a further call set up signal originating from a further subscriber, making a further coupling between said further subscriber and said terminal user, said further call set up signal being different from said call set up signal,
        said generating means are adapted for, in response to at least a finishing part of said further coupling, generating a third billing signal, and
        said memory means are adapted for storing third billing information corresponding with said third billing signal at a third location corresponding to a third party, said third party being different from said terminal user
        and further characterized in that said switching means comprise at least a first switch and a second switch, said starting part of said coupling comprising at least a connection between said subscriber and said first switch, said finishing part of said coupling and said finishing part of said further coupling each comprising at least a connection between said second switch and said terminal user.

7. Memory means for use in a telecommunication system comprising
- switching means for, in response to a call set up signal originating from a subscriber, making a coupling between said subscriber and a terminal user,
- generating means for, in response to a starting part of said coupling, generating a first billing signal, and for, in response to a finishing part of said coupling, generating a second billing signal, and
- said memory means for storing first billing information corresponding with said first billing signal at a first location corresponding to said subscriber and for storing second billing information corresponding with said second billing signal at a second location corresponding to said terminal user, characterized in that
- said switching means are adapted for, in response to a further call set up signal originating from a further subscriber, making a further coupling between said further subscriber and said terminal user, said further call set up signal being different from said call set up signal,
- said generating means are adapted for, in response to at least a finishing part of said further coupling, generating a third billing signal, and
- said memory means are adapted for storing third billing information corresponding with said third billing signal at a third location corresponding to a third party, said third party being different from said terminal user.

8. Method comprising the steps of
- in response to a call set up signal originating from a subscriber, making a coupling between said subscriber and a terminal user via switching means,
- in response to a starting part of said coupling, generating a first billing signal,
- in response to a finishing part of said coupling, generating a second billing signal,
- storing first billing information corresponding with said first billing signal at a first location corresponding to said subscriber, and
- storing second billing information corresponding with said second billing signal at a second location corresponding to said terminal user, characterized in that said method comprises the steps of
- in response to a further call set up signal originating from a further subscriber, making a further coupling between said further subscriber and said terminal user, said further call set up signal being different from said call set up signal,
- in response to at least a finishing part of said further coupling, generating a third billing signal, and
- storing third billing information corresponding with said third billing signal at a third location corresponding to a third party, said third party being different from said terminal user.

9. Method according to claim 8, characterized in that said switching means comprise at least a first switch and a second switch, said starting part of said coupling comprising at least a connection between said subscriber and said first switch, said finishing part of said coupling and said finishing part of said further coupling each comprising at least a connection between said second switch and said terminal user.

10. Method according to claim 8, characterized in that said terminal comprises a mobile station and that said coupling and said further coupling each comprise at least one base station, at least one of said call set up signals defining said user of said mobile station.

11. The switching means of claim 6, characterized in that said terminal comprises a mobile station and that said coupling and said further coupling each comprise at least one base station, at least one of said call set up signals defining said user of said mobile station.

12. The switching means of claim 6, characterized in that said switching means comprise converting means for converting said further call set up signal into said call set up signal defining said terminal.

13. The switching means of claim 6, characterized in that said switching means comprise converting means for converting both said call set up signal and said further call set up signal into a yet further call set up signal defining said terminal.

14. Method according to claim 9, characterized in that said terminal comprises a mobile station and that said coupling and said further coupling each comprise at least one base station, at least one of said call set up signals defining said user of said mobile station.

* * * * *